United States Patent
Chan et al.

(10) Patent No.: US 7,422,719 B2
(45) Date of Patent: *Sep. 9, 2008

(54) PROCESS FOR REMOVING OIL-BASED COMPONENTS AND FORMING CERAMIC BODIES

(75) Inventors: Yuk F. Chan, Painted Post, NY (US); David S. Franzen, Painted Post, NY (US); Jon A. Passmore, Painted Post, NY (US); Mark A. Spetseris, Pine City, NY (US); Gary G. Squier, Beaver Dams, NY (US); Elizabeth M. Vileno, Corning, NY (US); Christopher S. Witte, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 643 days.

This patent is subject to a terminal disclaimer.

(21) Appl. No.: 10/688,168

(22) Filed: Oct. 17, 2003

(65) Prior Publication Data

US 2004/0079469 A1 Apr. 29, 2004

Related U.S. Application Data

(60) Provisional application No. 60/422,191, filed on Oct. 29, 2002.

(51) Int. Cl.
*B28B 1/00* (2006.01)
*B28B 3/00* (2006.01)
*B28B 5/00* (2006.01)
*C04B 33/32* (2006.01)
*C04B 33/36* (2006.01)
*C04B 35/64* (2006.01)

(52) U.S. Cl. .......................... 264/630; 34/265; 34/274; 34/254; 501/82; 501/94; 501/108

(58) Field of Classification Search ................. 264/630, 264/638, 669, 670, 656, 631
See application file for complete search history.

(56) References Cited

U.S. PATENT DOCUMENTS

| | | | | |
|---|---|---|---|---|
| 3,885,977 | A | | 5/1975 | Lachman et al. ............... 106/62 |
| 4,717,340 | A | * | 1/1988 | Wiech, Jr. .................... 432/199 |
| 4,731,208 | A | * | 3/1988 | Nakajima et al. ......... 264/37.13 |
| 4,900,698 | A | * | 2/1990 | Lundsager .................... 501/80 |
| 4,902,459 | A | * | 2/1990 | Matsubara et al. .......... 264/670 |
| 5,263,263 | A | * | 11/1993 | Gheorghiu et al. ............ 34/250 |
| 6,080,345 | A | | 6/2000 | Chalasani et al. ........... 264/109 |
| 6,200,517 | B1 | | 3/2001 | Peng et al. |
| 6,287,510 | B1 | * | 9/2001 | Xun ........................... 264/630 |
| 6,368,992 | B1 | | 4/2002 | Beall et al. ..................... 501/94 |
| 2004/0262820 | A1 | | 12/2004 | Brennan et al. ............. 265/657 |

* cited by examiner

*Primary Examiner*—Philip C Tucker
*Assistant Examiner*—Phu H Nguyen
(74) *Attorney, Agent, or Firm*—Joseph M. Homa; Randall S. Wayland; Anca C. Gheorghiu

(57) ABSTRACT

An improvement in a process of forming ceramic articles comprising oil-based components or extrusion aids, the improvement including removing the oil-based components after drying and prior to firing by flowing a heated gas through the green ceramic honeycomb articles to evaporate and condense the oil-based components, with or without microwave radiation.

21 Claims, 4 Drawing Sheets

PROCESS FOR REMOVING OIL-BASED COMPONENTS AND FORMING CERAMIC BODIES

This application claims the benefit of U.S. Provisional Application No. 60/422,191, filed Oct. 29, 2002, entitled "Process for Removing Oil-Based Components and Forming Ceramic Bodies", by Y. F. Chan et al.

BACKGROUND OF THE INVENTION

The instant invention relates to an improvement in a process of forming ceramic multicellular articles. More particularly, the present invention relates to removal of oil-based components from shaped green ceramic articles after drying and before firing to avoid uncontrolled burning and hazardous conditions during manufacturing, and an apparatus for carrying out the same.

Popular ceramic multicellular ceramic bodies which are generally formed by extrusion, such as those finding applications in catalytic converters, diesel particulate filters, electrically heated catalysts, and chemical processing, require binders and extrusion aids for proper processing. Typically, water-soluble cellulose ether binders are used; however, such binders alone are not suitable for the manufacture of high cell density cellular structures having a large frontal area and extremely thin walls of less than webs of 0.002 inch (0.048 mm) or less. U.S. Pat. Nos. 6,080,345 and 6,368,992 disclose the use of oils or oil-based compounds, such as polyalphyl olefin, in combination with cellulose ether binders for improved processing of such structures.

While advantageous in providing shape retention for very thin-wall ceramics in the wet green strength, oils lead to significant problems during firing. Specifically, such compounds release small volatile combustibles when heated, which unless controlled effectively can lead not only to cracking of the structural bodies, but also to uncontrolled combustion, or detonation in the kiln. At temperatures above their flash points, the oils decompose quickly and lead to sudden thermal stresses which may increase the risk of cracking in the ceramic articles.

Removal of the organic compounds during firing comprises a sequence of simultaneous reactions which are fairly complex, including, for example, oxidation, volatilization, and thermal degradation. Therefore, it is difficult to remove the organic components from the shaped green ceramic article without incurring distortion or breakage of the part.

Because of the reduced strength of the very thin wall ceramic honeycomb substrates, and the corresponding increase in the dimensional changes due to the exothermic nature of the removal of the organic compounds, special consideration in the firing must be undertaken to avoid cracking of the ceramic body. Specially designed kilns, apparatus for volatile removal, reduced oxygen containing atmospheres, and complicated firing cycles are among the numerous means that have been employed to control the burnout of organic compounds, decrease the combustible concentrations in the kiln atmosphere, and reduce the thermal stresses differential shrinkage and high cracking frequency. These methods however, require expensive and sophisticated equipment and increase the cost of firing.

In light of the foregoing problems experienced in the art, there remains a need for a method of fabricating and firing ceramic articles processed from batch mixtures containing oil-based compounds to form ceramic honeycomb structural bodies exhibiting less cracks, in a cost-effective and efficient manner.

SUMMARY OF THE INVENTION

In accordance with one aspect of the present invention, there is provided an improvement in a process of forming ceramic articles comprising oil-based components or extrusion aids, the improvement including removing the oil-based components after drying and prior to firing by flowing a heated gas through the green ceramic honeycomb articles to evaporate the oil-based components. Following evaporation, the gas is cooled to allow for condensation and isolation of the oil-based components.

Accordingly the practice of the invention involves forming a mixture of components comprising inorganic ceramic powder materials, a binder, a solvent for the binder, and, an oil-based component (hereinafter referred to as oil) having a flash point or ignition temperature; mixing and plasticizing the components to form a plasticized mixture; shaping the plasticized mixture into a green ceramic article; drying the green ceramic article; removing at least 70%, preferably at least 85%, and more preferably at least 95% of the oil from the dried green ceramic article by flowing a heated inert gas through the green ceramic article; and, firing the green ceramic article substantially absent the oil to develop the product structure.

The heated gas is flowed at a rate of 2 to 10 standard cubic feet per minute (scfm) per 90 cubic inches of green ceramic article, preferably at a rate of 4 to 8 scfm. The gas may be air or a processed gas, such as nitrogen ($N_2$). The gas is used at a temperature which heats the green ceramic article to just below the flash point of the oil-based component contained therein. The flash point is the temperature at which vapor given off will ignite when an external flame is applied under specific test conditions. For example, if the oil has a flash point of 160° C., then preferably the gas has a temperature of between 110°-165° C., more preferably between 120°-140° C. when the gas is air, and between 155°-160° C. when the gas is $N_2$.

In accordance with another aspect of the invention, there is provided an apparatus for removing oil-based components from green ceramic articles. The apparatus comprises a heating chamber for receiving the green ceramic articles and removing the oil-based components therefrom; a heat source coupled to an inert gas source for introducing a heated inert gas into the heating chamber; and, a heat exchanger coupled to a condensation chamber for collecting the removed oil-based components. Optionally, the apparatus further includes an adjustable microwave source, which may be operated at a power level of up to 400 watts per 90 cubic inches of ceramic article, preferably 100 Watts.

The heating chamber comprises a device for receiving and supporting the green ceramic articles. In one embodiment the device comprises a perforated base and a plate overlaying the base, the plate comprising a first end and a second end, and a set of holes sized to fit the ceramic articles, the holes extending from the first end to the second end of the plate, the holes being in communication with the perforated base. In another embodiment the device comprises a base having a first end and a second end, and a set of grooves cut into the base adjacent the first end but not extending to the second end, the set of grooves sized to the dimensions of the ceramic articles, each grove further having a plurality of holes extending through the second end of the base.

In still another embodiment the heating chamber comprises a plurality of devices for receiving and supporting the green ceramic articles, the devices arranged vertically in the heating chamber. Preferably the heating chamber is maintained at a pressure of 100 kPa to 130 kPa.

BRIEF DESCRIPTION OF THE DRAWINGS

The invention may be further understood by reference to the drawings wherein.

DESCRIPTION OF THE INVENTION

Figure 1:
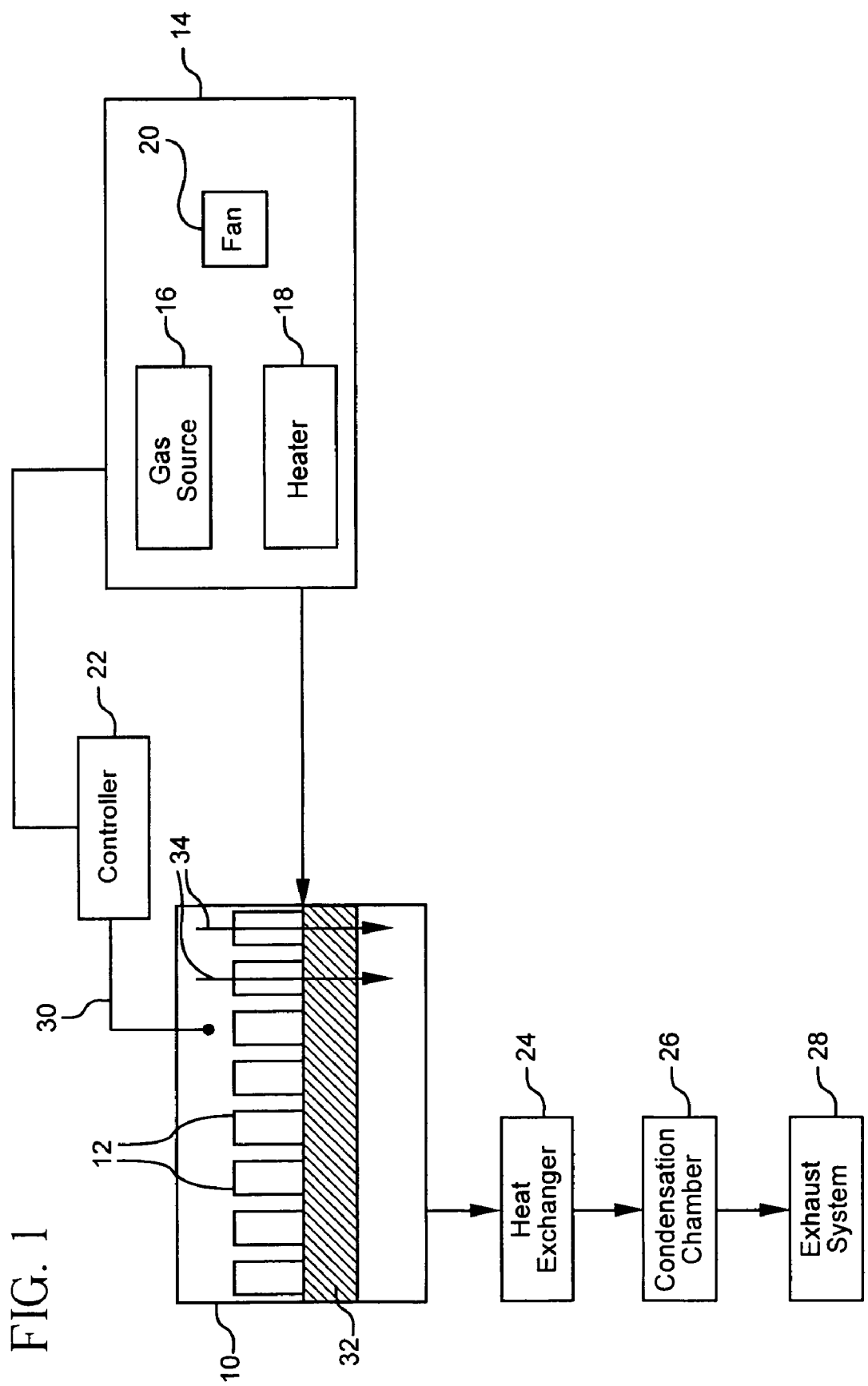
FIG. 1 is a block diagram of an apparatus illustrating one embodiment of the invention.

There is provided an improvement in the process of making ceramic multicellular articles, in particular ceramic honeycomb structures comprising oil-based components or extrusion aids. The improvement resides in removing oils from the green ceramic articles after drying and prior to firing to avoid uncontrolled burning and hazardous conditions during firing. This is achieved by flowing a heated inter gas through the green ceramic articles at a temperature, flow rate and time, sufficient to remove at least 70%, more preferably at least 85%, and most preferably at least about 95%.

The invention is applicable to ceramic powder processing which includes the formation of shaped articles from inorganic raw material powders and organic compounds. However, the invention is particularly suitable to the formation of ceramic articles which contain cordierite, and/or mullite. Examples of such mixtures being 2% to 60% mullite, and 30% to 97% cordierite, with allowance for other phases, typically up to 10% by weight. Some ceramic batch material compositions for forming cordierite that are especially suited to the practice of the present invention are those disclosed in U.S. Pat. No. 3,885,977 which is herein incorporated by reference in its entirety.

One composition which ultimately forms cordierite upon firing is as follows in percent by weight: 33% to 41%, and most preferably 34% to 40% of aluminum oxide, 46% to 53% and most preferably 48% to 52% of silica, and 11% to 17%, and most preferably 12% to 16% magnesium oxide. Suitable cordierite-forming inorganic ceramic powder raw materials for the purpose of forming cordierite-containing ceramic articles may be selected from any source, and preferably include high-purity clay, talc, silica, alumina, aluminum hydroxides, and magnesia (MgO)-yielding raw materials. The preferred inorganic ceramic raw materials include kaolinite clay, talc, and alumina.

Types of clay are non-delaminated kaolinite raw clay, such as Hydrite MP™ clay, or Hydrite PX™ clay, delaminated kaolinite, such as KAOPAQUE-10™ (K10) clay, and calcined clay, such as Glomax LL™. All of the above named materials are sold by Dry Branch Kaolin. Some typical kinds of talc are those having a surface area of about 5-8 $m^2$/g, such as supplied by Barretts Minerals, under the designation MB 96-67™. Some typical aluminas are coarse aluminas, for example, Alcan C-700 series, such as C-701™, or fine aluminas such as A-16SG™ from Alcoa. One typical kind of silica is that having a particle size of about 9-11 micrometers, and a surface area of about 4-6 $m^2$/g, such as IMSIL™ sold by Unimin Corporation.

In filter applications, such as in diesel particulate filters, it is customary to include a burnout agent in the mixture in an amount effective to subsequently obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 50%, and more typically about 15% to about 30% by weight based on the powder material.

The inorganic ceramic raw materials are combined with organic compounds which according to the present invention include but are not limited to binders, lubricants, surfactants, and the like. In a preferred embodiment the organic compounds include an oil or oil-based compound, a binder, and optionally other organic processing aids such as surfactant. A solvent for the binder is also provided which may or may not be an organic.

Suitable oil or oil-based compounds in the formation of cordierite ceramic articles according to the present invention are low molecular oils (e.g., Durasyn® 162 HP polyalpholefin, available from Amoco Chemicals). A binder acts to bind the inorganic powders and impart plasticity to the batch when mixed with a solvent. Especially useful in the practice of this invention are cellulose ether binders, such as methylcellulose, and/or methylcellulose derivatives. A solvent for the binder is provided to dissolve the binder, and further provide plasticity to the batch and wetting of the powders. The solvent can be aqueous or organic-based, which is normally water or another water-miscible solvent. For cellulose ether binders, the solvent is water. The surfactant, if present, promotes emulsification between the solvent and oil. Some surfactants that can be used in the practice of the present invention are stearic acid, oleic acid, and combinations of these.

The inorganic raw materials are mixed together with the organic compounds and solvent to form a plasticized batch mixture. In a preferred embodiment, the batch composition comprises 100 parts by weight of inorganic powder raw materials, 4 to 10 parts by weight of the oil, 2 to 5 parts by weight of the binder, 0.2 to 1 parts by weight of the surfactant, and 8 to 25 parts by weight of the solvent.

Batch formation takes place in two stages prior to the shaping step. In the first stage or wetting stage of batch formation, the inorganic powder particles, surfactant (if present), and the binder component are dry mixed followed by addition of the solvent such as in a Littleford mixer. The solvent is added in an amount that is less than is needed to plasticize the batch. The powder particles are coated and dispersed by the surfactant, solvent, and oil. In a second stage the plasticization takes place. In this stage the wet mix from the first stage is sheared in any suitable mixer in which the batch will be plasticized.

The resulting plasticized batch is then shaped into a green structural body by any known method for shaping plasticized mixtures, such as e.g. extrusion, injection molding, slip casting, centrifugal casting, pressure casting, dry pressing, and the like. The invention is best suited for extrusion through a die. The extrusion operation can either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The ceramic articles of this invention can have any convenient size and shape and the invention is applicable to all processes in which plastic powder mixtures are shaped. The process is especially suited to the production of cellular monolith bodies such as honeycombs. Cellular bodies find use in a number of applications such as catalytic, adsorption, electrically heated catalysts, filters such as diesel particulate filters, molten metal filters, regenerator cores, and the like.

The green ceramic structural bodies are dried according to conditions well known in the art, and thereafter are fired according to conditions described as follow. Organic materials of the type described above are typically removed from green ceramic bodies in the temperature region of about 100°-600° C. The major obstacle in using mixtures with organics is that the articles crack when fired, particularly in very thin wall honeycomb structures. The cracking is a result of internal stresses developed during the removal of large amount of organics which causes excessive temperature or pressure gradients internal to the bodies. Furthermore, the fast release of organics over a narrow temperature range can produce dangerously high concentrations of combustible compounds in the kiln atmosphere and potentially explosions.

Following drying and prior to firing, a portion of the oil is removed so as to avoid uncontrolled burning and hazardous conditions during manufacturing. Removal is accomplished by forcing heated gas, with or without microwave heating, at a desired velocity through ceramic articles to evaporate the oil-based non-solvent component. Preferably at least 70%, more preferably at least 85%, and most preferably at least about 95% of the oil-based non-solvent component is removed.

One embodiment of the present invention is shown in FIG. 1 as a block diagram of an apparatus. This apparatus comprises a processing chamber 10 configured to receive a mass of ceramic ware 12 positioned vertically on a support device 32. A gas system 14 is coupled, directly or indirectly, to the processing chamber 10. The gas system 14 comprises a gas source 16, a heater 18 for heating the gas and a fan or pump 20 for controlling the velocity of the gas. The gas system 14 is further connected to a gas system controller 22 for controlling the velocity and temperature of the gas. The gas system controller 22 in turn is in communication with the processing chamber 10 through a temperature measurement system 30 such as a thermocouple. The temperature measurement system 30 is preferably placed at a desired distance above the ceramic ware 12.

The processing chamber 10 is further coupled to a heat exchanger 24 which acts to cool the hot gas from the processing chamber 10 to a temperature sufficient to allow for condensation of the oil-based non-solvent in the condensation chamber 26. An exhaust system 28, which acts to evacuate the cooled gas free of the condensed oil-based non-solvent, is preferably in communication with the condensation chamber 26. In an alternate embodiment the condensed oil-based non-solvent is reused in the ceramic batch forming components. In an additional embodiment a recirculation system (not shown) could take the place of the exhaust system 28, and recirculate the gas.

A gas for purposes of the present invention is either air or a non-reactive gas. Cost-wise air is preferred. A suitable non-reactive gas is nitrogen ($N_2$), especially when the process temperature is close to the flash point of the oil. In operation hot gas is forced at a desired velocity by fan or pump 20 through gas inlet ducts (not shown) into the processing chamber 10 downward through the longitudinal cells of ceramic ware 12, the direction which as indicated by arrows 34. The hot gas uniformly heats the ceramic ware 12 in order to effect efficient removal of the oil.

The temperature and velocity of the gas supplied to the ceramic ware 12 is controlled by gas system controller 22 which operates the heater 18 and fan or pump 20. The gas system controller 22 is coupled to a temperature measurement device 30, such as a thermocouple, which is direct contact with the interior of processing chamber 10. A suitable gas velocity or flow rate for the purposes of the present invention ranges between 0.2 and 8 standard cubic feet per minute (scfm) per 90 cubic inches of green ceramic ware 12. The gas flow depends on the wall thickness of the honeycomb structure being processed. Generally, the thicker the walls the slower the rate employed. It is preferred to utilize a gas flow rate of between 4 and 8 scfm. The temperature of the gas is sufficient to heat the ceramic article to a temperature below the flash point of the oil contained therein. Gas temperatures of between 110° and 165° C. have been successfully utilized to remove an oil with a flash point of 160° C., although preferably the air temperature is between 120° and 140° C., and closer to 160° C. when the gas is $N_2$.

After flowing through the ceramic ware 12, the hot gas carrying the oil exits the processing chamber 10 through gas outlet ducts (not shown) and enters the heat exchanger 24 where it is cooled off. From the heat exchanger 24, the now-cooled gas reaches the condensation chamber 26 where the oil is condensed into a liquid by means known in the art. The hot gas prevents condensation of the removed oil back on the ceramic ware 12 or on the heating chamber 10, thus allowing for a safe efficient process. In operation the removal of the oil involves evaporation, with subsequent condensation, but not burning-off. The dangers associated with burning of oil components during firing found in the prior art, are therefore minimized and substantially eliminated. It has been found that the removal process according to the present invention does not affect the properties of the product.

The recovered oil can be periodically evacuated through the condensation chamber 26 through an exit or drain (not shown). It is also contemplated that the recovered oil may be for its intended purpose as discussed in the forming processing steps above. When using a gas other than air, a cost effective measure is to recirculate the gas. In such an instance a recirculation system (not shown) would replace the exhaust system, the recirculation system being coupled to the gas system. The heating chamber 10 is preferably maintained at a pressure of about 100 kPa to 150 kPa and at a temperature above 120° C.

Figure 2:
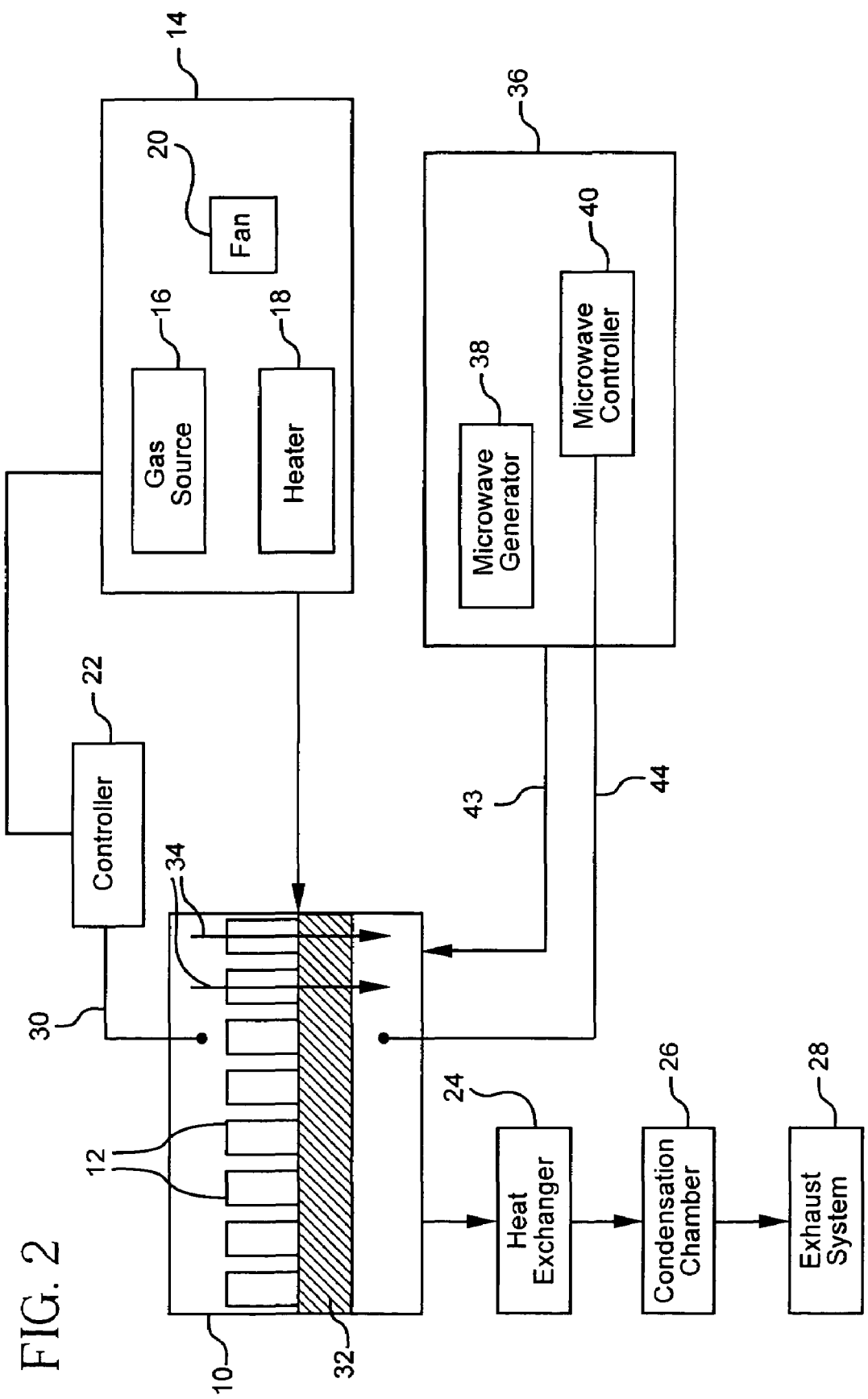
FIG. 2 is a block diagram of an apparatus illustrating another embodiment of the invention.

In another embodiment, microwave power is utilized in order to effect faster heating of the ceramic ware. Referring now to FIG. 2 therein shown is another embodiment of the present invention as a block diagram of an apparatus. This apparatus is similar to the apparatus of FIG. 1, with the addition of a microwave system 36 coupled directly or indirectly, to the processing chamber 10. In this embodiment processing chamber 10 is also a cavity resonator. The microwave system 36 comprises a microwave generator or source 38 and a microwave controller 40. The microwave generator 38 is coupled to the processing chamber 10 by any suitable means, such as waveguides 43. The microwave controller 40 which functions to control the microwave generator 38 is in communication with inside of the processing chamber 10 through temperature measurement 44 located below the ceramic ware 12.

The microwave source employed to generate the microwaves can comprise any conventional magnetron with an adjustable power feature. Preferably, the frequency of incident microwave used should be greater than 800 mHz, preferably between about 915 mHz or 2.45 GHz, which are designated industrial band in the United States. Furthermore, the power of the incident microwave need be no greater than that sufficient to, as described above, heat the ceramic articles to the desired temperature. Specifically, the microwave power source should possess variable power levels ranging between 1 to 75 kW. The microwave controller is standard such as those known in the industry and comprises one or more solid state devices capable of achieving the desired control of the power of the microwave energy delivered to the processing chamber. The microwave power is operated at levels of up to 400 Watts (W) per 90 cubic inches of green ceramic ware, most preferably at 100 W.

In setting up the parameters or setpoints necessary for determining the necessary gas temperature and velocity, as well as microwave radiation, to remove a portion of oil components in a reasonable time, factors including the ceramic composition, geometry, capabilities of the equipment should be considered. For example, a cordierite honeycomb body exhibiting a 7 in. length, a diameter of 3.866 in., a 2.8 mil cell wall thickness and a cell density of 900 cell/in$^2$ is heated in $N_2$ for 35 minutes to about 160° C., at a gas flow rate of about 6.0 scfm, with no hold, followed by a 15 minute cool down to about 100° C. For a similar product, with the microwave radiation of 100 Watts, the ceramic ware is heated for 6 minutes to about 160° C. at a flow rate of 4.0 scfm, with a hold of 6 minutes at top temperature, followed by a 5 minute cool down to about 100° C. In another example, a diesel particulate substrate, comprising a cordierite honeycomb body having a length of 4.7 in., a diameter of 5.66 in., a 20 mil wall thickness, and a cell density of 200 cell/in$^2$ is heated in $N_2$ for 60 minutes to about 150° C., at a gas flow rate of about 1.5 scfm, with a hold of 1 hour at top temperature, followed by a 15 minute cool down to about 100° C.

Figure 3:
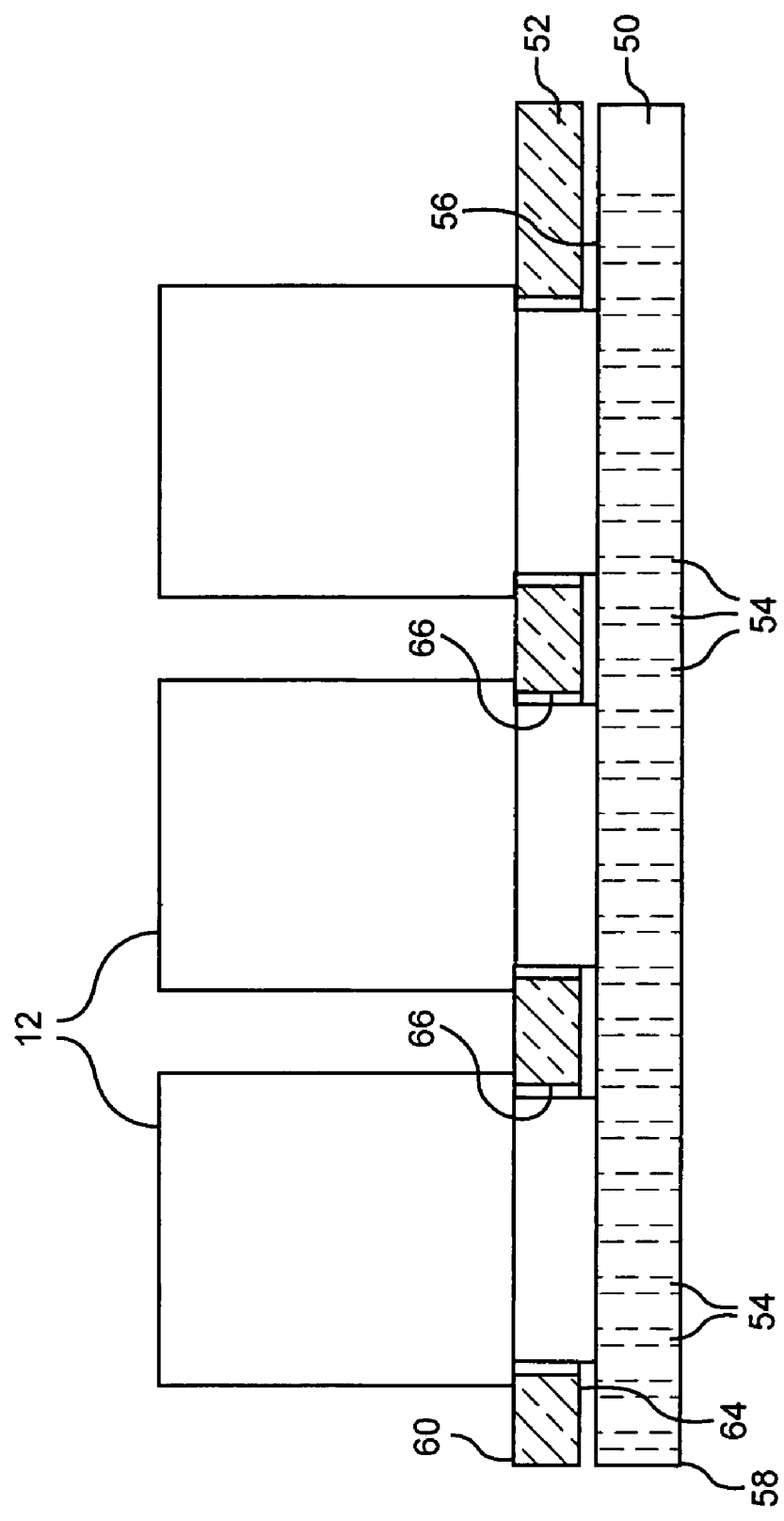
FIG. 3 is a cross-sectional view of an embodiment of a device for supporting ceramic articles in the process of the present invention.

The processing chamber 10 is configured to receive a mass of ceramic ware 12 which could either be arranged to be stationary or continuously passed therethrough. A support device, having a shelf-like design, is employed to receive and hold a plurality of ceramic ware. An embodiment of a suitable support device 32 is shown in cross-section in FIG. 3 and comprises a base 50 and a detachable plate 52. Base 50 comprises a plurality of perforations 54 which extend from a top end 56 to a bottom end 58. The design of base 50 is such to allow the heated gas to flow therethrough. A plate 52 overlays base 50, and comprises a first plate surface 60, a second plate surface 64, and a set of holes 66 extending therebetween. The holes 66 are in communication with the perforated base 50, and sized to receive and support the ceramic articles being processed. Holes 66 are smaller than the received ceramic ware. The number of ceramic articles arranged on the plate 52 is not significant in the practice of the present invention. Plate 52 may be interchanged with similar members depending on the dimensions and number of ceramic articles being processed in a given cycle. The ceramic articles 12 are arranged on support device 32 vertically in order to effect the flow of the heated gas longitudinally through the cell channels of the honeycomb structure.

Figure 4:
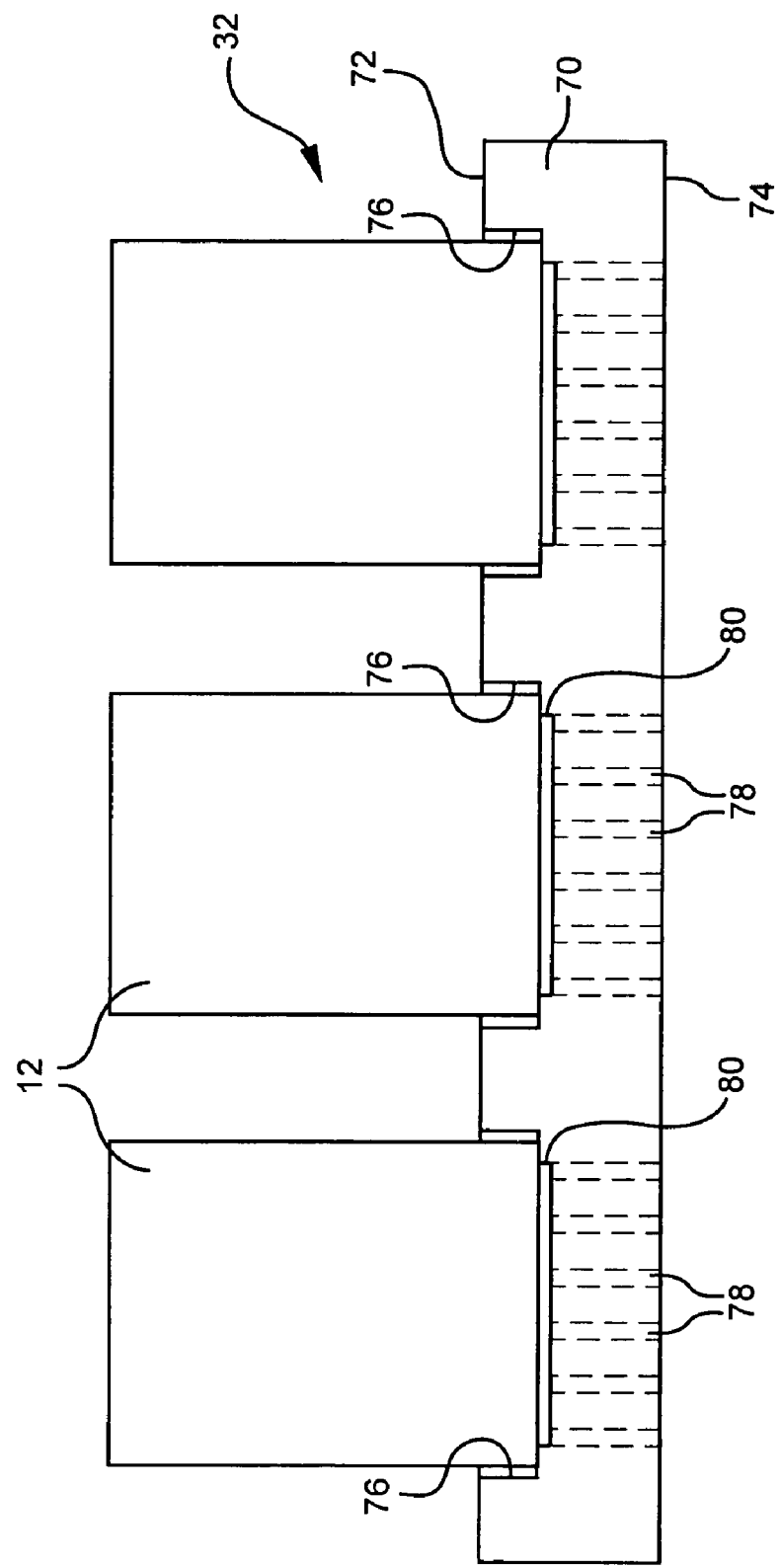
FIG. 4 is a cross-sectional view of another embodiment of a device for supporting ceramic articles in the process of the present invention.

Referring now to FIG. 4 therein shown is another embodiment of a support device 32 for suitable for receiving and holding a mass of ceramic ware 12 for processing according to the present invention. The support device 32 comprises a base 70 having a top end 72, a bottom end 74, and a set of apertures 76 cut adjacent to the top end 72, but not extending to the bottom end 74. The set of apertures 76 are sized to the dimensions of the ceramic articles 12. Each aperture 76 further includes a plurality of perforations 78 extending through the bottom end 74 for the heated gas to flow therethrough, and a lip 80 along the periphery of each aperture for supporting the ceramic article 12 a distance above the perforations 78, to encourage efficient gas flow.

It is envisioned that in one embodiment the processing chamber comprises a plurality of such support devices mounted vertically the length of the processing chamber. In another embodiment the processing chamber comprises one support device which is either stationary or continuously moving.

Following the removal of the oil, the prepared ceramic bodies, still green, are then fired at a selected temperature under suitable atmosphere and for a time dependent upon the composition, size and geometry so as to result in a fired body of the desired ceramic. The invention is not limited to specific firing temperatures and times. For example, in compositions which are primarily for forming cordierite, the temperatures are typically from about 1300° C. to about 1450° C., and the holding times at these temperatures are from about 1 hour to about 8 hours. For mixtures that are primarily for forming mullite, the temperatures are from about 1400° C. to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours.

There are numerous benefits associated with the present method of removing oil-based components and forming ceramic bodies. By removing the oil-based components prior to firing, the green ceramic bodies can be fired faster and more safely. The stringent requirements of controlling the kiln atmosphere during firing of green ceramic bodies containing oil-based non-solvent is eased in the instant invention allowing firing in conventional kilns and reducing manufacturing costs. Further, already existing forming and manufacturing processes can be utilized.

What is claimed:

1. A method for forming a multicellular ceramic article, the method comprising:
  a. forming a mixture of components comprising inorganic ceramic powder materials, a binder, an aqueous solvent for the binder, and an oil-based component having a flash point;
  b. mixing and plasticizing the components to form a plasticized mixture;
  c. shaping the plasticized mixture into a green honeycomb article;
  d. drying the green honeycomb article;
  e. removing at least 70% of the oil-based component from the green honeycomb article by flowing a heated gas longitudinally through the green honeycomb article, wherein the heated gas is flowed at a rate of 0.2 to 8 standard cubic feet per minute (scfm) per 90 cubic inches of the green honeycomb article; and,
  f. firing the green honeycomb article having a portion of the oil-based component removed to form the multicellular ceramic article.

2. The method of claim 1 wherein the multicellular ceramic article is a cellular monolith.

3. The method of claim 1 wherein the heated gas is flowed at a rate of 4 to 8 scfm per 90 cubic inches of the green honeycomb article.

4. The method of claim 3 wherein the heated gas is at a temperature which heats the green honeycomb article below the flash point of the oil-based component.

5. The method of claim 4 wherein the gas is at a temperature which can heat the green honeycomb article to between 110° C. to 165° C.

6. The method of claim 5 wherein the heated gas is air.

7. The method of claim 6 wherein the air is maintained at a temperature of between 120°-140° C.

8. The method of claim 5 wherein the heated gas is nitrogen ($N_2$).

9. The method of claim 8 wherein the $N_2$ is maintained at a temperature of between 155°-160° C.

10. The method of claim 8 wherein the $N_2$ gas is recirculated.

11. The method of claim 1 wherein at least 85% of the oil-based component is removed.

12. The method of claim 11 wherein at least 95% of the oil-based component is removed.

13. The method of claim 1 wherein the portion of oil-based component that is removed is reused in step a.

14. The method of claim 1 wherein the aqueous solvent is water.

15. The method of claim 1 wherein the binder is a cellulose ether binder.

16. The method of claim 1 wherein the binder comprises methylcellulose or a methylcellulose derivative.

17. A method for forming a multicellular ceramic article, the method comprising:
   forming a mixture of components comprising inorganic ceramic powder materials, a binder, an aqueous solvent for the binder, and an oil-based component having a flash point;
   mixing and plasticizing the components to form a plasticized mixture;
   shaping the plasticized mixture into a green honeycomb article; then
   removing at least 70% of the oil-based component from the green honeycomb article by flowing a heated gas longitudinally though the green honeycomb article for less than or equal to about 1 hour, wherein the heated gas is flowed at a rate of 0.2 to 8 standard cubic feet per minute (scfhi) per 90 cubic inches of the green honeycomb article; and, then
   firing the green honeycomb article into the multicellular ceramic article.

18. The method of claim 17 wherein at least 85% of the oil-based component is removed prior to the firing.

19. The method of claim 17 wherein at least 95% of the oil-based component is removed prior to the firing.

20. The method of claim 17 wherein the heated gas is flowed longitudinally though the green honeycomb article for less than 15 minutes.

21. A method for forming a multicellular ceramic article, the method comprising:
   forming a mixture of components comprising inorganic ceramic powder materials, a binder, an aqueous solvent for the binder, and an oil-based component having a flash point;
   mixing and plasticizing the components to form a plasticized mixture; shaping the plasticized mixture into a green honeycomb article comprising longitudinal cells; then
   positioning the green honeycomb article on a support device such that the longitudinal cells are arranged vertically; then
   removing at least 70% of the oil-based component from the green honeycomb article by forcing a heated gas vertically through the longitudinal cells of the green honeycomb article, wherein the heated gas is flowed at a rate of 0.2 to 8 standard cubic feet per minute (scfm) per 90 cubic inches of the green honeycomb article; then firing the green honeycomb article into the multicellular ceramic article.

* * * * *

UNITED STATES PATENT AND TRADEMARK OFFICE
CERTIFICATE OF CORRECTION

PATENT NO. : 7,422,719 B2  Page 1 of 1
APPLICATION NO. : 10/688168
DATED : September 9, 2008
INVENTOR(S) : Yuk Fung Chan et al.

It is certified that error appears in the above-identified patent and that said Letters Patent is hereby corrected as shown below:

|         | *Col.* | *Line* | *Description*                        |
|---------|--------|--------|--------------------------------------|
| Claim 1 | 10     | 3      | "though" should read --through--.    |
| Claim 1 | 10     | 6      | "(scfhi)" should read --(scfm)--.    |
| Claim 20| 10     | 15     | "though" should read --through--.    |

Signed and Sealed this

Sixteenth Day of June, 2009

JOHN DOLL
*Acting Director of the United States Patent and Trademark Office*